(12) United States Patent
Shin (10) Patent No.: US 12,430,152 B2
(45) Date of Patent: Sep. 30, 2025

(54) SELECTIVELY INVOKING AN AUTOMATED ASSISTANT ACCORDING TO A RESULT OF SHAPE DETECTION AT A CAPACITIVE ARRAY

(71) Applicant: GOOGLE LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/210,586

(22) Filed: Jun. 15, 2023

(65) Prior Publication Data

US 2024/0419463 A1    Dec. 19, 2024

(51) Int. Cl.
  *G06F 3/048* (2013.01)
  *G06F 3/044* (2006.01)
  *G06F 3/16* (2006.01)
  *G06F 9/451* (2018.01)

(52) U.S. Cl.
  CPC .............. *G06F 9/453* (2018.02); *G06F 3/044* (2013.01); *G06F 3/167* (2013.01)

(58) Field of Classification Search
  CPC ........... G06F 9/453; G06F 3/044; G06F 3/167
  See application file for complete search history.

(56) References Cited

U.S. PATENT DOCUMENTS

| | | | | |
|---|---|---|---|---|
| 2011/0175830 A1* | 7/2011 | Miyazawa | ............ | G06F 1/1647 |
| | | | | 345/173 |
| 2013/0076688 A1* | 3/2013 | Tokutake | .............. | G06F 3/0446 |
| | | | | 345/174 |
| 2020/0348777 A1 | 11/2020 | Cormier, Jr. et al. | | |
| 2020/0349966 A1* | 11/2020 | Konzelmann | .......... | G06V 40/16 |
| 2021/0011557 A1 | 1/2021 | Lemay et al. | | |
| 2022/0122599 A1 | 4/2022 | Sharifi et al. | | |

FOREIGN PATENT DOCUMENTS

| | | |
|---|---|---|
| EP | 3521983 A1 | 8/2019 |
| WO | 2020244401 A1 | 12/2020 |
| WO | 2021145895 | 7/2021 |

OTHER PUBLICATIONS

European Patent Office; Invitation to Pay Additional Fees issued in Application No. PCT/US2023/036283; 13 pages; dated Mar. 4, 2024.
European Patent Office; International Search Report and Written Opinion issued in Application No. PCT/US2023/036283; 20 pages; dated Apr. 25, 2024.

* cited by examiner

*Primary Examiner* — Thanh T Vu
(74) *Attorney, Agent, or Firm* — Gray Ice Higdon (57) ABSTRACT

Implementations set forth herein relate to controlling invocation of an automated assistant according to whether a capacitive touch sensor array has detected a particular input that indicates a user has positioned an assistant-enabled device near their face. The capacitive touch sensor array can be part of a touch display interface of a portable computing device that provides access to an automated assistant. When the interface is positioned near the face of the user, input data from the interface can be processed to determine whether the input data indicates the display interface is near their face or whether the user is providing some other input to the display interface. When the input data indicates the user is positioning the display interface near their face or mouth, the automated assistant can be invoked in lieu of the user providing any other invocation input.

20 Claims, 5 Drawing Sheets

SELECTIVELY INVOKING AN AUTOMATED ASSISTANT ACCORDING TO A RESULT OF SHAPE DETECTION AT A CAPACITIVE ARRAY

BACKGROUND

Humans can engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") can provide commands and/or requests to an automated assistant using spoken natural language input (i.e., utterances), which may in some cases be converted into text and then processed, and/or by providing textual (e.g., typed) natural language input.

As mentioned above, many automated assistants are configured to be interacted with via spoken utterances. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives input from the user, and provides audible and/or graphical responses), and that interfaces with one or more additional components that implement the automated assistant (e.g., on-device component(s) and/or remote server device(s) that process user inputs and generate appropriate responses).

Some explicit user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more particular spoken invocation phrases, which are also known as "hot words/phrases" or "trigger words/phrases". For example, a particular spoken invocation phrase such as "Hey Assistant," "OK Assistant", and/or "Assistant" can be spoken to invoke an automated assistant.

Requiring an explicit user interface input to invoke an automated assistant can cause extending of an overall duration of an interaction between the user and the automated assistant delays to achieving some benefits from the automated assistant. For example, the duration is extended at least by the amount of time required for the user to provide the explicit user interface input. This issue can be exacerbated in circumstances in which a user has a series of requests over the course of some duration of time, thereby necessitating that the user repeatedly explicitly invoke the automated assistant.

Additionally or alternatively, various explicit user interface inputs for invoking an automated assistant can fail (e.g., a false positive invocation or a false negative) in various contexts. For example, providing a spoken invocation phrase can fail to invoke an automated assistant when an environment is noisy, the user's voice is muffled (e.g., due to wearing a face mask), and/or other environmental condition(s) are present. As another example, attempting to select a virtual button at the client device can fail when the user is wearing gloves, when the user's dexterity is limited, and/or other environmental condition(s) are present.

SUMMARY

Implementations set forth herein relate to invoking an automated assistant in response to determining, based on processing input data from capacitive touch sensors of a computing device, that a user is holding the computing device near, or within a threshold distance of, their face. The computing device can be, for example, a cellular phone that includes a touch display interface that is configured to receive tactile inputs from a user for controlling various applications of the computing device. The touch display interface can include an array of capacitive touch sensors that can operate by being responsive to static charge and/or changes in charge of nearby surfaces.

Although the capacitive touch sensors are typically utilized for detecting tactile inputs, implementations disclosed herein recognize and leverage that the capacitive touch sensors can also be utilized to detect non-tactile inputs that implicitly indicate a user desires to invoke an automated assistant, such as non-tactile inputs that indicate the user is holding the computing device near, or within a threshold distance of, their face. For example, when the user maneuvers the computing device towards their face, or is otherwise holding the computing device within a threshold distance of their face, a subset of capacitive touch sensors of the array of capacitive touch sensors can be responsive to any facial features of the user. The response of the subset of capacitive touch sensors can exhibit a particular shape (relative to the entire array of capacitive touch sensors) that is indicative of facial feature(s) and/or can exhibit particular magnitude values of response that are indicative of facial feature(s) (e.g., not indicative of tactile input). In some implementations, the particular shape and/or the magnitude value(s) can be characterized by input data from the capacitive touch sensors. The input data can be processed for determining whether to invoke the automated assistant for responding to any subsequent spoken utterance from the user. For example, the input data can be processed to determine a shape that is characterized by the input data and, when the shape is determined to correspond to facial feature(s) (e.g., a mouth of the user), the automated assistant can be invoked. In these and other manners, the need that the user provide any explicit invocation input (e.g., an invocation phrase such as "Ok, Assistant . . . " or a tactile selection of an interface element) to invoke the automated assistant can be bypassed. Invoking the automated assistant can cause one or more previously dormant function(s) of the automated assistant to be initialized, such as automatic speech recognition (ASR), natural language understanding, fulfillment, and/or other function(s) that were dormant prior to invocation.

In some implementations, the array of one or more capacitive touch sensors can include capacitive touch sensors that indicate responsiveness to external stimuli with a magnitude value of response. Alternatively, or additionally, the array of capacitive touch sensors can characterize the external stimuli by indicating a shape of the stimuli relative to the shape of the array. In some implementations, a heuristic process and/or one or more trained machine learning models can be utilized to determine whether an external stimulus corresponds to a direct tactile touch input or a non-tactile input. For example, when the magnitude value for a response satisfies a threshold magnitude and/or an area of the response does not satisfy a threshold area, the corresponding input can be considered a direct touch (tactile)

input event. However, when the magnitude value of the response does not satisfy the threshold magnitude, but the area of the response does satisfy the threshold area, the corresponding input can be considered a non-tactile input. In some implementations, when the threshold magnitude is not satisfied but the threshold area is satisfied, input data can be further processed to determine whether the area of response of a subset of capacitive touch sensors corresponds to a shape of a facial feature, such as a mouth. The automated assistant can be invoked in response to determining the corresponding input is a non-tactile input (vs. a tactile input) and/or in response to determining that the area of response of the subset of capacitive touch sensors corresponds to the shape of a facial feature.

In some implementations that utilize a trained machine learning model (e.g., a neural network model such as a convolutional neural network model), the input data can be processed, using the machine learning model, to generate output that reflects whether the input data reflects a facial feature. For example, the input data can be a single channel M×N image, where M×N reflects the dimensions of the capacitive touch sensor array and the single channel includes, for each pixel, a corresponding magnitude value. Further, the output can be a measure, such as a value from 0 to 1, that reflects whether the input data reflects a facial feature (e.g., values closer to 1 are more indicative of a facial feature). The machine learning model can be trained, for example, based on supervised training instances that each include a corresponding M×N capacitive touch sensor array image and a corresponding supervised label that is either a positive label (e.g., "1") indicating the capacitive touch sensor array is near a face or a negative label (e.g., "0") indicating the capacitive touch sensor array is not near the face.

In some implementations, a digital signal processor can be used, independent of any use of a system on a chip and/or other higher power processor(s), in initially monitoring for a candidate non-tactile input for invoking an automated assistant. For example, the digital signal processors can monitor a stream of input data (e.g., magnitude values of response) from the capacitive touch sensors according to a heuristic process to determine whether any of the outputs in the stream indicate a candidate non-tactile input. In response to detecting a candidate non-tactile input in a subset of the input data, the digital signal processor can cause the subset and/or following input data to be further processed to determine whether the candidate non-tactile input is indeed a non-tactile input that should cause invocation of the automated assistant. Such further processing can be using higher power processor(s) and using a more intensive heuristic process and/or using a trained machine learning model. For example, when the digital signal processor indicates that its initial monitoring indicates a non-tactile input, input data characterizing the response of the capacitive touch sensors can be further processed (e.g., using a system on a chip and/or other higher power processor(s)) to determine whether the candidate non-tactile input is indeed a non-tactile input that should cause invocation of the automated assistant (e.g., whether the user is holding their device near their face and/or mouth).

For example, in response to an output from the digital signal processor that indicates the initial detection based on the input data, one or more heuristic processes (e.g., in addition to any utilized by the digital signal processor) and/or trained machine learning models can be utilized to determine whether characteristics of the input data indicate non-tactile input that should cause invocation of the automated assistant (e.g., indicate that the user is holding the device near their face and/or mouth). In these and other manners, the more resource efficient digital signal processor can be utilized initially in detecting whether the array of capacitive touch sensors is responding to the user holding their device near their face and/or mouth, and less resource efficient processor(s) only utilized in verifying an initial determination by the digital signal processor. This can preserve computational resources, such as processing bandwidth and power, while still allowing for frequent (e.g., continual or at least selective) monitoring for a non-tactile input for invoking an automated assistant.

In various implementations, the digital signal processors can begin monitoring for a candidate non-tactile input for invoking an automated assistant in response to output from an accelerometer and/or gyroscope, of the computing device, indicating that the computing device has been picked up and/or is being actively held. For example, the digital signal processor can monitor for three seconds or other monitoring clock duration, and the monitoring clock duration can be reset each time the accelerometer and/or the gyroscope indicates that the computing device has been picked up and/or is being actively held.

The above description is provided as an overview of some implementations of the present disclosure. Further description of those implementations, and other implementations, are described in more detail below.

Other implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described above and/or elsewhere herein. Yet other implementations can include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
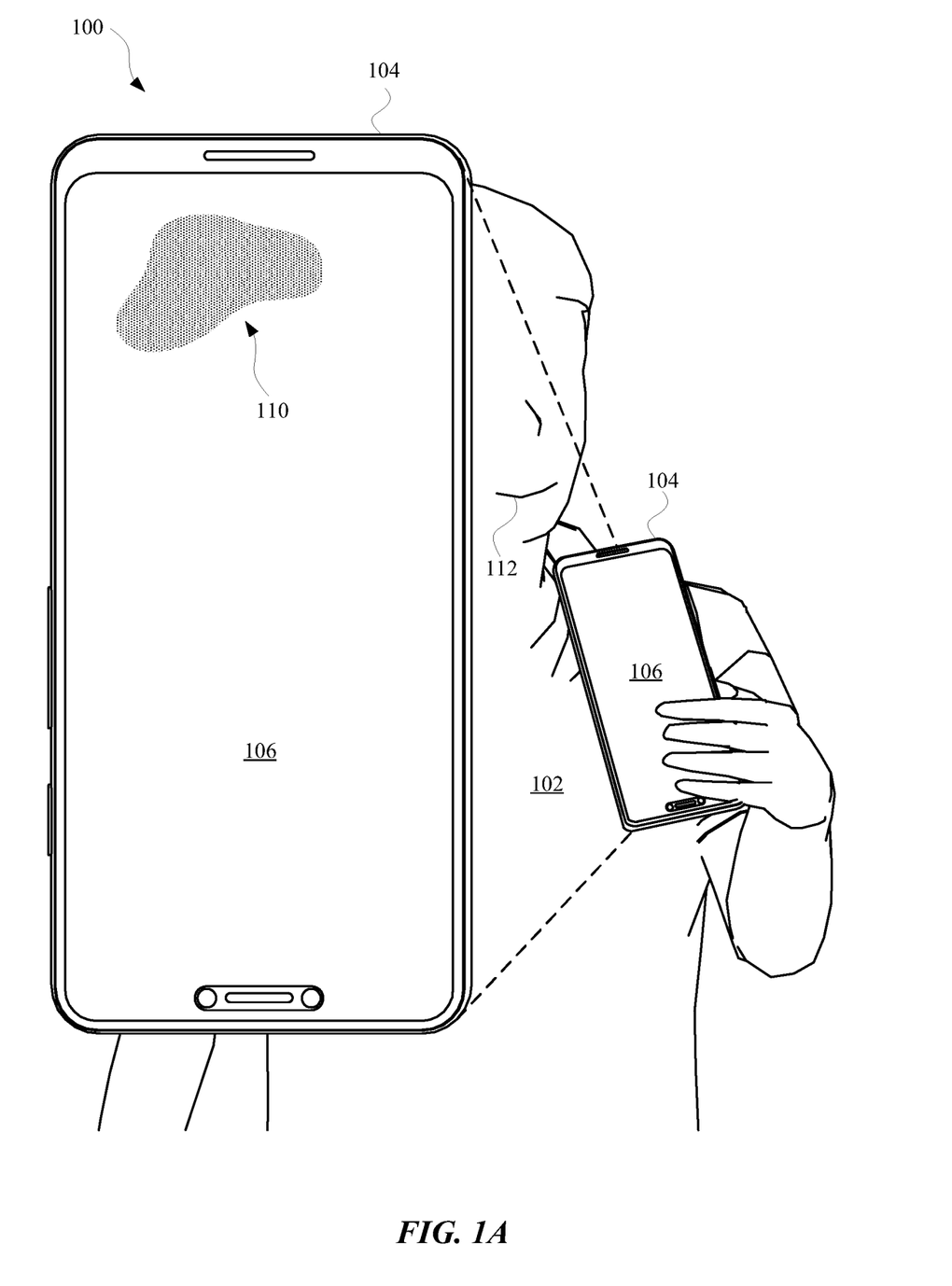
FIG. 1A and FIG. 1B illustrate views of a user invoking their automated assistant by causing their mouth, or other facial feature, to be detected by a capacitive touch sensor array of a display interface of their computing device.
Figure 1B:
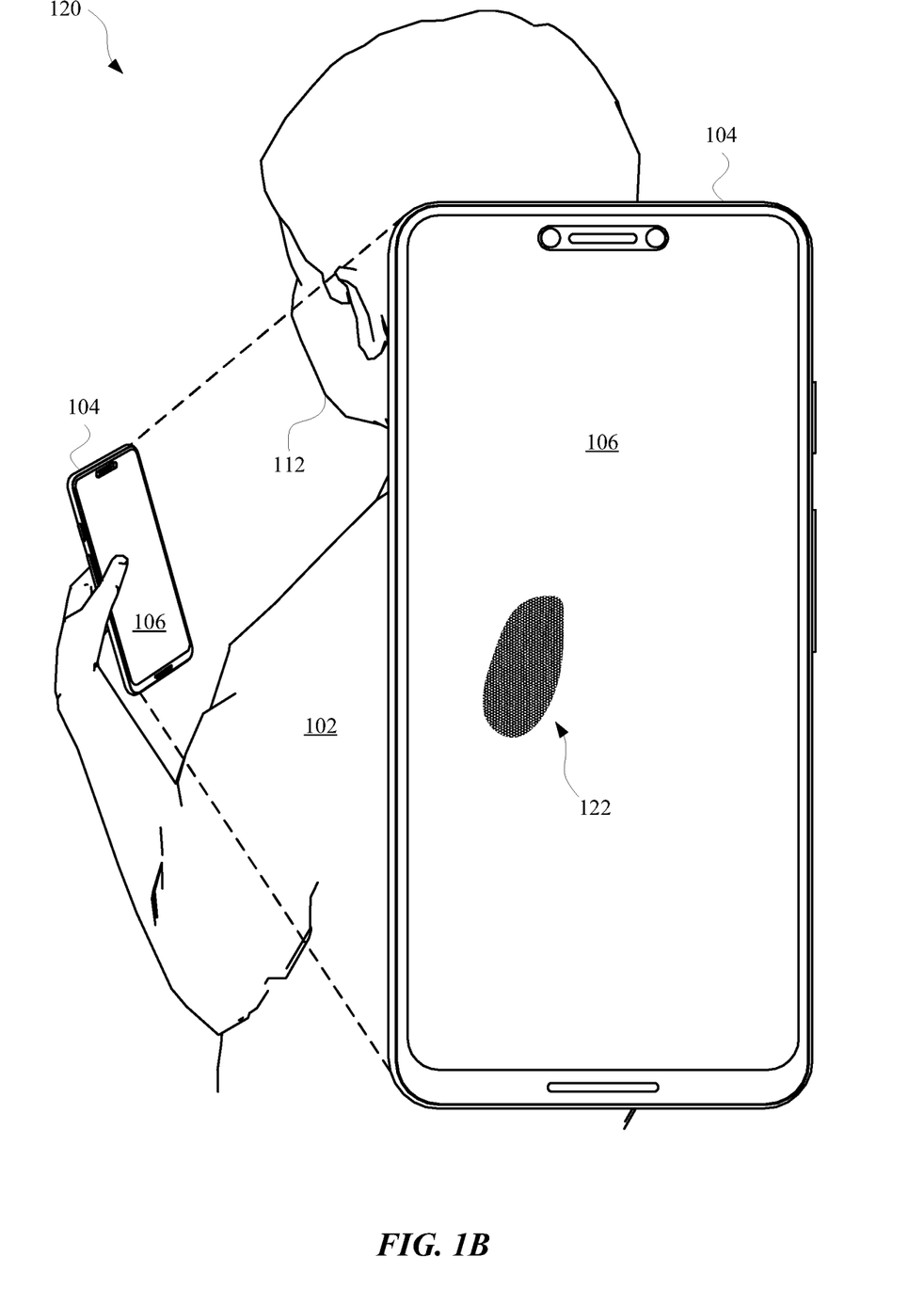

FIG. 1A and FIG. 1B illustrate a view 100 and a view 120 of a user 102 invoking their automated assistant by causing their mouth, or other facial feature, to be detected by a capacitive touch sensor array of a display interface 106 of their computing device 104. For example, FIG. 1A illustrates a view 100 of a user 102 holding their computing device 104 at a detectable distance from their mouth 112. The computing device 104 can include a display interface 106 that can embody an array of capacitive touch sensors. The capacitive touch sensors can be responsive to direct touch inputs to the display interface and, in some implementations, can be responsive to non-touch inputs (e.g., inputs that are not caused by direct user contact with the display interface). For example, a non-touch input can include the user 102 holding the computing device 104 within a threshold distance (e.g., a dynamic or static distance value) of their mouth 112, thereby cause an area 110 of the capacitive touch sensors to be responsive to the mouth 112 of the user 102.

In some implementations, input data generated based on a response from the capacitive touch sensors can be sampled and/or otherwise processed using a digital signal processor (DSP). When the DSP detects a particular type of input at the display interface 106, the DSP can cause a separate processor (e.g., a System on a Chip (SoC)) to further process the response and/or detected input from the capacitive touch sensors. In some implementations, a rate and/or duration of sampling by the DSP can be adjusted according to a context of the computing device 104 and/or the user 102, and/or any other factors that can influence whether an input is being provided. For example, an accelerometer of the computing device 104 can provide an indication that the user 102 has repositioned the computing device 104 and, in response, a sampling rate and/or sampling duration of the DSP can be increased or otherwise adjusted.

In some implementations, one or more heuristic processes and/or one or more machine learning models can be utilized to determine whether a response from the capacitive touch sensors corresponds to the face of the user 102 and/or a specific facial feature of the user 102. For example, the area 110 in FIG. 1A can illustrate a response to the user 102 positioning their computing device 104 near their mouth 112, while a different area 122 in FIG. 1B can illustrate a response to the user 102 tapping the display interface 106 with their finger. In some implementations, a response of the capacitive touch sensors can indicate a degree of force or change in charge that the capacitive touch sensors are experiencing. In this way, touch inputs and non-touch inputs can be further distinguished, because the capacitive touch sensors would experience different pressures and/or changes in charge for each type of input.

When a type of input corresponding to FIG. 1A is detected, an automated assistant can be invoked without requiring the user 102 to provide any explicit invocation input (e.g., spoken invocation phrase, touch input) to invoke the automated assistant. In some implementations, when this type of non-touch input is detected and is determined to correspond to the user 102 positioning the computing device 104 near their mouth 112, the automated assistant can be invoked, at least for a duration of time after the non-touch input is detected.

Figure 2:
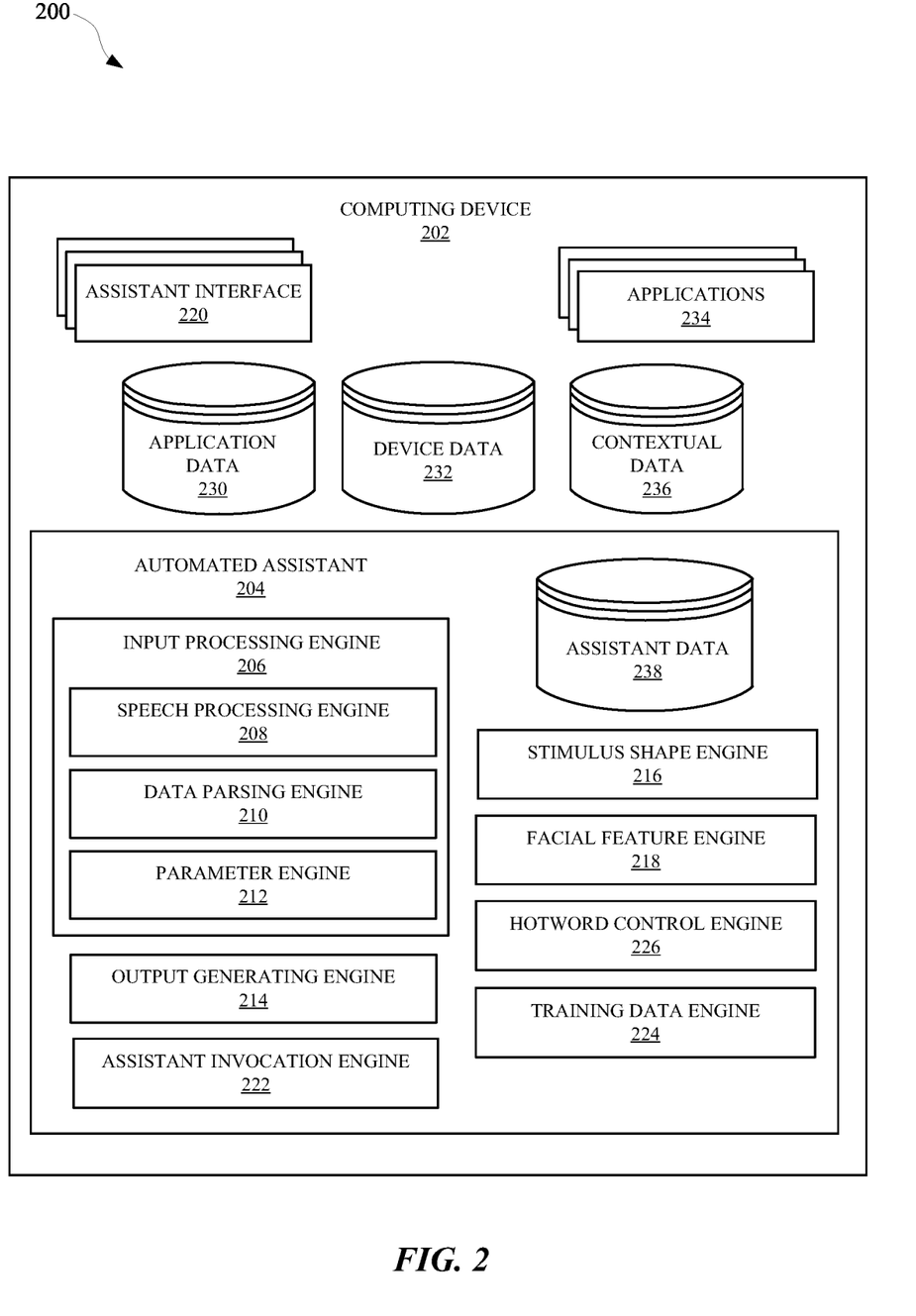
FIG. 2 illustrates a system that provides an automated assistant that can be invoked in response to determining, using capacitive touch sensors, that a user is holding their computing device near their face.

FIG. 2 illustrates a system 200 that provides an automated assistant 204 that can be invoked in response to determining, using capacitive touch sensors, that a user is holding their computing device near their face. The automated assistant 204 can operate as part of an assistant application that is provided at one or more computing devices, such as a computing device 202 and/or a server device. A user can interact with the automated assistant 204 via assistant interface(s) 220, which can include a microphone, a camera, a touch screen display, a user interface, and/or any other apparatus capable of providing an interface between a user and an application. For instance, a user can provide a verbal, textual, and/or a graphical input to an assistant interface 220 to cause the automated assistant 204 to initialize one or more actions (e.g., provide data, control a peripheral device, access an agent, generate an input and/or an output, etc.). The input(s) can be provided to the automated assistant 204 following an invocation of the automated assistant 204 and/or can be processed by component(s) of the automated assistant 204 based on detecting the invocation. For example, one or more of a speech processing engine 208, data parsing engine 210, and parameter engine 212 can be activated in response to the automated assistant 204 being invoked. The automated assistant 204 can be implicitly invoked based on processing of input data at a capacitive array as described herein. In some implementations, the automated assistant 204 can additionally be explicitly invoked in response to detecting a spoken invocation phrase, actuation of an interface element, and/or other explicit input(s). The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. In some implementations, the device data can include data from one or more sensors of the computing device 202, such as a motion sensor (e.g., an accelerometer, gyroscope, etc.) and/or an array of capacitive touch sensors, and/or a light sensor (e.g., a camera, LiDAR sensor, etc.). The assistant invocation engine 222 can process this data to determine whether or not to wait for a user to expressly speak an invocation phrase to invoke the automated assistant 204, or consider the data to be indicative of an intent by the user to invoke the automated assistant—in lieu of requiring the user to expressly speak the invocation phrase. For example, the one or more trained machine learning models can be trained using instances of training data that are based on scenarios in which the user is in an environment where multiple devices and/or applications are exhibiting various operating states. The instances of training data can be generated to capture training data that characterizes contexts in which the user in fact intends to invoke the automated assistant (e.g., by maneuvering the computing device 202 near their mouth), and other contexts in which the user does not intend to invoke the automated assistant (e.g., when raising their phone into the air to capture someone's attention).

When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context, device position, device movement, and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236 (e.g., based on the user maneuvering the computing device 202 near their mouth for another reason)—which would otherwise cause the automated assistant 204 to be invoked if the assistant suppressing output was not being detected.

In some implementations, the system 200 can include a stimulus shape engine 216 that can determine when a threshold area of a capacitive sensor array is exhibiting a response to an external stimulus. In some implementations, the stimulus shape engine 216 can be operated by a DSP and/or any other processor, which can initially sample a response of the capacitive sensor array before additional processing is performed on an input. For example, a response of the capacitive sensor array can be sampled and compared to an initial threshold for determining whether the initial threshold is satisfied. When the initial threshold is satisfied, the stimulus shape engine 216 can communicate with a facial feature engine 218 for determining whether the response of the capacitive sensor array indicates that a user has positioned the computing device 202 near their face and/or mouth for preparing to interact with the automated assistant 204.

In some implementations, the stimulus shape engine 216 can determine whether a threshold area of the capacitive sensor array is responding to an external stimulus with at least a threshold magnitude response. Alternatively, or additionally, the stimulus shape engine 216 can determine whether the threshold area of the capacitive sensor array is responding to the external stimulus with less than another threshold magnitude response. In this way, the stimulus shape engine 216 can avoid being responsive to non-inputs, while also avoiding being responsive to direct touch inputs and/or other direct, tactile inputs to the capacitive sensor array. When the conditions are satisfied for initially detecting a particular shape and/or magnitude for an external stimulus, the stimulus shape engine 216 can communicate with the facial feature engine 218.

The facial feature engine 218 can process input data characterizing a responsiveness of the capacitive sensor array of the display interface using one or more heuristic processes and/or one or more trained machine learning models. For example, the facial feature engine 218 can process the input data using one or more machine learning models in furtherance of providing an output that can indicate whether a user is holding their phone near their mouth. The one or more machine learning models can be trained using instances of training data generated by the training data engine 224 and/or a different application or module. The training data can include, for example, a supervised label that indicates a first training instance of input data indicated that a user positioned their cellular phone near their mouth. Additionally, the training data can include another supervised label that indicates a second training instance of input data indicated that the user or another user did not position their cellular phone near their mouth. Each instance of input data can correspond to a response of a capacitive sensor array to an external stimulus, thereby allowing the machine learning model to be trained to assist with facilitating automated assistant responses to stimuli detected by a capacitive sensor array.

When the facial feature engine 218 indicates that a user has positioned the computing device 202 or another computing device (e.g., a wearable device, tablet device, and/or any other portable computer) near their mouth, the facial feature engine 218 can communicate with a hotword control engine 226. The hotword control engine 226 can receive a communication from the facial feature engine 218 and, in response, elect to bypass or not enforce hotword detection before invoking the automated assistant 204. Alternatively, or additionally, the hotword control engine 226 and/or the assistant invocation engine 222 can receive a communication from the facial feature engine 218 and cause the automated assistant 204 to be invoked. Alternatively, or additionally, the hotword control engine 226 can receive a communication from the facial feature engine 218 indicating that the user has positioned their computing device near their mouth. In response, the hotword control engine 226 and/or the assistant invocation engine 222 can cause the automated assistant 204 to be invoked for performing NLU on any subsequent input spoken utterance without necessitating that the user provide another invocation input (e.g., beyond positioning their device near their mouth). In some implementations, the automated assistant 204 can be invoked for a duration of time that is static, or dynamic based on data generated by an accelerometer and/or other data characterizing a position of the device. For example, the duration can be: (1) relatively longer when the user has positioned the device near their mouth but no subsequent motion has been detected, or (2) relatively shorter when the user has positioned the device near their mouth but then subsequently repositioned the device to be away from their mouth.

Figure 3:
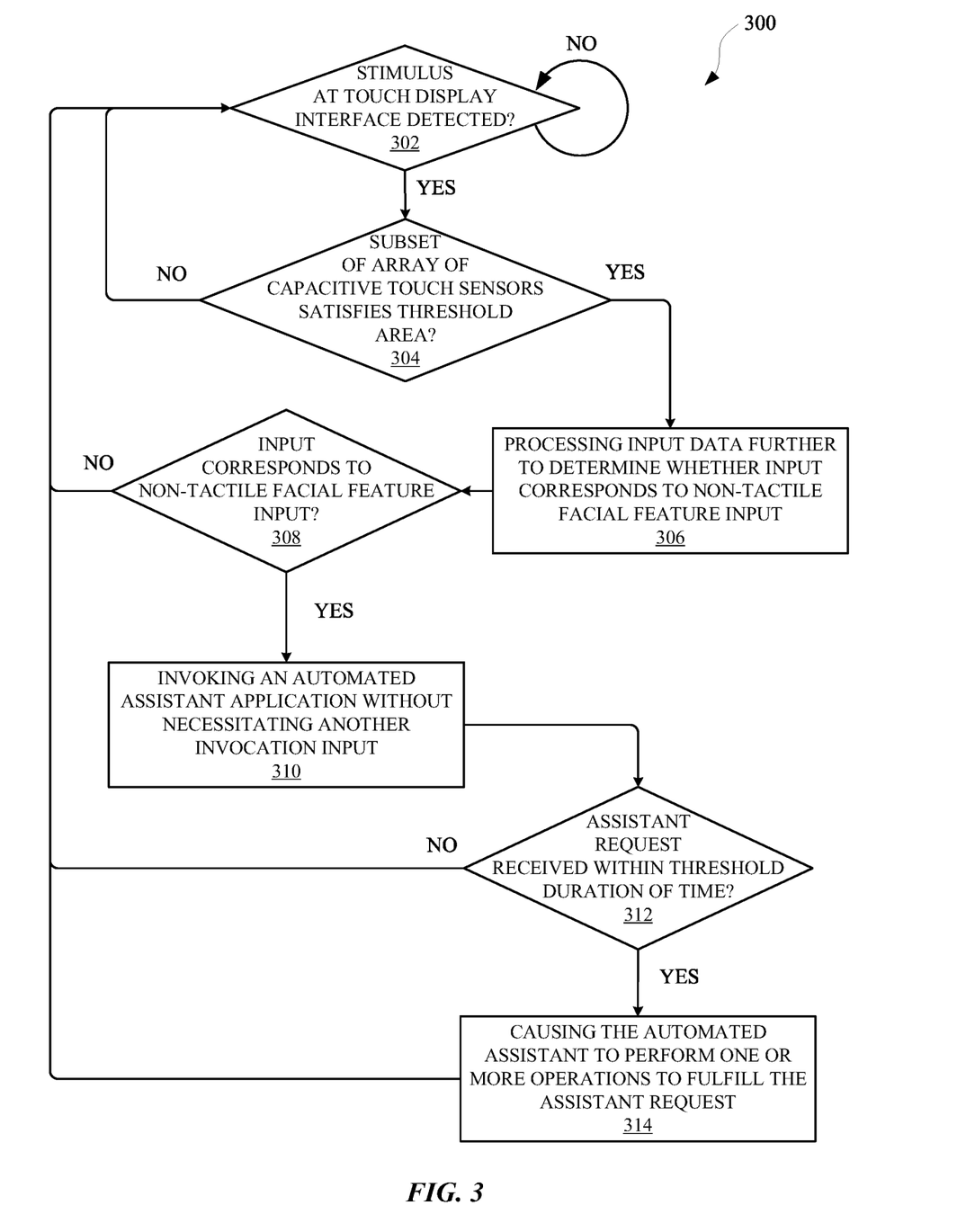
FIG. 3 illustrates a method for invoking an automated assistant responsive to a user maneuvering their device to a detectable distance from their mouth, as indicated by an array of capacitive touch sensors.

FIG. 3 illustrates a method 300 for invoking an automated assistant responsive to a user maneuvering their device near their mouth, as indicated by an array of capacitive touch sensors. The method 300 can be performed by one or more computing devices, applications, and/or any other apparatus or module that can be associated with an automated assistant.

The method 300 can include an operation 302 of determining whether stimulus was received at a touch display interface. The touch display interface can include an array of capacitive touch sensors that can be responsive to changes in static energy detected at or near the touch display interface. In some implementations, a degree to which one or more sensors is responding to a change in charge at or near the display interface can be characterized by input data. For example, the input data can characterize a magnitude value for each capacitive sensor of the array of capacitive touch sensors. In some implementations, the input data can be sampled periodically, non-periodically, or otherwise according to a setting of a digital signal processor, thereby allowing a less computationally intensive process to handle initial determinations of whether an input is being provided to the touch display interface.

When a stimulus is detected at the touch display interface, the method 300 can proceed from the operation 302, to an operation 304. The operation 304 can include determining whether a subset of capacitive touch sensors of the array of capacitive touch sensors satisfies a threshold area. The threshold area can be a number of capacitive touch sensors that embody a particular shape and/or size. For example, the threshold area can be a total number of capacitive touch sensors and/or a percentage of capacitive touch sensors of the array of capacitive touch sensors. Alternatively, or additionally, the operation 304 can include determining whether the subset of capacitive touch sensors exhibit a response that has a magnitude value that satisfies or does not satisfy a threshold magnitude value. For example, the threshold of the operation 304 can optionally include a range of values between two other values, such as a lower threshold and an upper threshold. In some implementations, magnitude values equal or below the lower threshold can represent a non-input or de minimis excitation at the capacitive touch sensors, and magnitude values equal to or above the upper threshold can represent tactile and/or touch inputs (e.g., not indicative of face or mouth detection). Therefore, when magnitude values for all or a percentage of touch sensors of an array are equal to and/or between the lower threshold and the upper threshold, the threshold magnitude value can be considered satisfied, and the method 300 can proceed from the operation 304 to an operation 306.

In some implementations, the operation 304 can include determining whether a percentage and/or a threshold number of capacitive array sensors of an array are exhibiting output values that satisfy the threshold magnitude value(s). Additionally, or alternatively, the operation 304 can include determining whether the capacitive array sensors exhibiting the threshold magnitude value are directly adjacent to each other and/or are within a threshold distance from each other in the array of capacitive touch sensors. Alternatively, or additionally, the operation 304 can include determining whether all, or a percentage or minimum number of, subsets (e.g., m×n size subsets of non-overlapping or overlapping sensors) of capacitive touch sensors within a set (e.g., R×S size set of sensors) of capacitive touch sensors include a percentage of, or a total number of, adjacent or contiguous capacitive touch sensors that satisfy the threshold magnitude. When a subset of touch sensors exhibiting the threshold value(s) does not include directly adjacent sensors, and/or otherwise sensors that are a threshold distance from each other, that satisfy the threshold value(s), the method 300 can optionally not proceed from the operation 304 to the operation 306. However, when a subset, or subsets, of capacitive touch sensors otherwise exhibit a response that satisfies the threshold magnitude, the method 300 can proceed from the operation of 304 to an operation 306. The operation 306 can include processing input data in furtherance of determining whether the input corresponds to a non-tactile facial feature input. A non-tactile facial feature input can include an instance in which the user maneuvers their computing device towards their face, and/or otherwise causes their computing device to be located at or near their face. This movement and/or placement of the computing device can cause the touch display interface to exhibit a response, as a result of a change in detected charge by the capacitive touch sensors. In some implementations, processing the input data can be performed by one or more heuristic processes and/or one or more trained machine learning models. For example, the input data can be characterized by an array of values that can be provided as an input to a neural network or other model, and an output of the neural network or other model can indicate whether the input data corresponds to a facial feature of a user. In some implementations, a trained machine learning model can be trained using training data that is labeled to indicate when a touch interface is near a mouth of a user and when a touch interface is not near a mouth of a user. In this way, a suitable machine learning model can be developed for allowing applications to be responsive to a user placing a touch display interface near their face or mouth.

The method 300 can proceed from the operation 306 to an operation 308 of determining whether the input corresponds to a non-tactile facial feature input. When processing the input data results in determining that the input corresponds to a non-tactile facial feature input, the method 300 can proceed to an operation 310. Otherwise, the method 300 can return to the operation 302 for determining whether another stimulus has been detected at the touch display interface. The operation 310 can include invoking an automated assistant application without necessitating any separate explicit invocation input. In other words, the automated assistant can be invoked to detect a subsequent spoken utterance without requiring the user to provide an invocation phrase such as, "Ok, Assistant." The automated assistant can be invoked for a threshold duration of time thereby allowing the user to provide a spoken utterance to the automated assistant while the user has positioned their computing device near their mouth or face.

The method 300 can proceed from the operation 310 to an operation 312, which can include determining whether an assistant request (e.g., a spoken utterance) was received from the user within the threshold duration of time. When the user has provided an assistant request during the duration of time, or otherwise when the user is holding the display interface near their face or mouth, the method 300 can proceed from the operation 312 to an operation 314. Otherwise, the method 300 can proceed from the operation 312 to return to the operation 302 or another suitable operation. The operation 314 can include causing the automated assistant to perform one or more operations to fulfill the assistant request provided by the user. For example, if the assistant request is a spoken utterance, the automated assistant can process the spoken utterance using ASR and perform one or more further operations (e.g., NLU, fulfillment) based on the ASR results. Thereafter, the method 300 can optionally return to the operation 302 and/or the operation 312 for detecting another assistant request.

Figure 4:
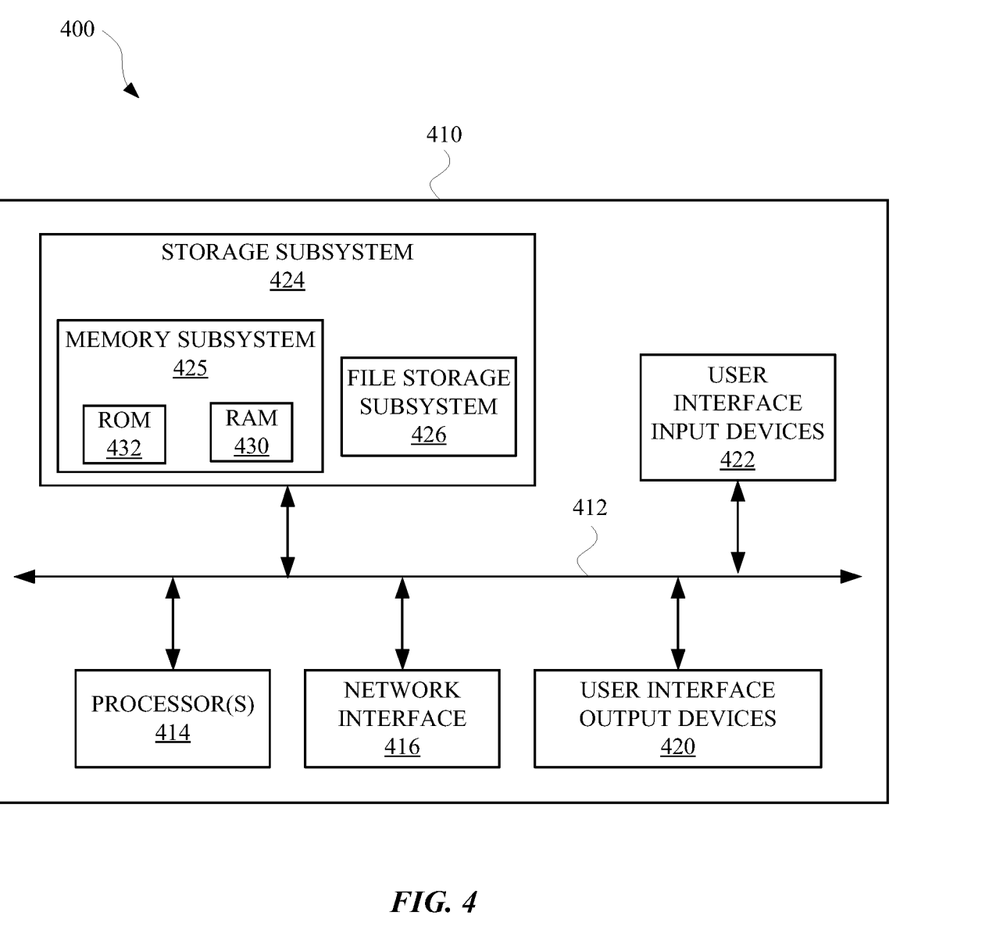
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by processor(s) is provided and includes generating, at a computing device, input data that characterizes a response, of an array of capacitive touch sensors, to an object that is external to the computing device and that is within a detectable distance from one or more capacitive touch sensors of the array of capacitive touch sensors. The array of capacitive touch sensors facilitates tactile input and non-tactile input to a display interface of the computing device. The method further includes determining, based on the input data, whether the response of the array of capacitive touch sensors corresponds to the display interface being within the detectable distance from a facial feature of a user. The facial feature of the user is detected in furtherance of preparing for an interaction between the user and an automated assistant application that is accessible via the computing device. The method further includes, in response to determining that the response of the array of capacitive touch sensors corresponds to the facial feature of the user causing, by the computing device, the automated assistant application to be responsive to a spoken utterance from the user without requiring an express invocation input from the user.

These and other implementations of the technology disclosed herein can include one or more of the following features.

In some implementations, causing the automated assistant application to be responsive to the spoken utterance from the user without requiring the express invocation input from the user includes causing the automated assistant application to bypass requiring hotword detection for a duration of time after determining that the response of the array of capacitive touch sensors corresponds to the facial feature of the user.

In some implementations, determining whether the response of the array of capacitive touch sensors corresponds to the display interface being within the detectable distance from the facial feature of the user includes determining a magnitude of the response of the array of capacitive touch sensors relative to a threshold magnitude for the tactile input to the capacitive array of touch sensors. The response can be determined to correspond to the facial feature of the user based on the magnitude of the response not satisfying the threshold magnitude for tactile inputs.

In some implementations, determining whether the response of the array of capacitive touch sensors corresponds to the display interface being within the detectable distance from the facial feature of the user includes determining whether an area of the response of the array of capacitive touch sensors satisfies a threshold area for non-tactile inputs to the capacitive array of touch sensors. The response can be determined to correspond to the facial feature of the user based on the area of the response satisfying the threshold area for non-tactile inputs.

In some implementations, determining whether the response of the array of capacitive touch sensors corresponds to the display interface being within the detectable distance from the facial feature of the user includes: processing the input data using one or more trained machine learning models that have been trained from supervised training instances. The supervised training instances can each include a corresponding supervised label indicating whether a corresponding user maneuvered a corresponding display interface within the detectable distance of a head or other facial feature of the corresponding user.

In some implementations, determining whether the response of the array of capacitive touch sensors corresponds to the display interface being within the detectable distance from the facial feature of the user includes processing the input data using one or more trained machine learning models that have been trained from training data that includes labels characterizing one or more others users holding respective display interfaces within the threshold distance from their faces.

In some implementations, the method further includes, in response to determining that the response of the array of capacitive touch sensors corresponds to the facial feature of the user, causing the computing device to render an output that indicates the automated assistant application has been invoked based on the response of the array of capacitive touch sensors. The output can be, for example, a haptic, an audible, and/or a visual output.

In some implementations, a method implemented by processor(s) is provided and includes determining, at a computing device, that a threshold area of a capacitive sensor array provided a response to an external stimulus. A touch display interface of the computing device includes the capacitive sensor array. The method further includes, in response to determining that the threshold area of the capacitive sensor array provided the response to the external stimulus, processing input data that characterizes the response of the capacitive sensor array to the external stimulus. The input data is processed using one or more trained machine learning models in furtherance of determining whether the external stimulus includes a facial feature of a user. The method further includes, determining, based on processing the input data, that the external stimulus that caused the response of the capacitive sensor array is estimated to include the facial feature of the user. The method further includes, in response to determining that the external stimulus is estimated to include the facial feature of the user: causing, by the computing device, an application to be responsive to a spoken utterance from the user without requiring a subsequent invocation input from the user.

These and other implementations of the technology disclosed herein can include one or more of the following features.

In some implementations, determining that the threshold area of the capacitive sensor array provided the response to the external stimulus is performed using a digital signal processor that samples an output of the capacitive sensor array. In some versions of those implementations, processing the input data that characterizes the response of the capacitive sensor array to the external stimulus is performed in response to the digital signal processor indicating that the output of the capacitive sensor array satisfies the threshold area. In some of those versions, processing the input data is performed at a processor that is separate from the digital signal processor.

In some implementations, the subsequent invocation input includes a hotword that is detectable by the computing device.

In some implementations, the method further includes determining, at the computing device, that the threshold area of the capacitive sensor array provided less than a threshold degree of response to the external stimulus. In those implementations, the input data is processed in response to determining that the threshold area of the capacitive sensor array provided less than the threshold degree of response to the external stimulus. In some versions of those implementations, the method further includes determining, at the computing device, that the threshold area of the capacitive sensor array provided at least an initial threshold degree of response to the external stimulus. In those versions, the input data is processed in response to determining that the threshold area of the capacitive sensor array provided at least the initial threshold degree of response to the external stimulus.

In some implementations, the method further includes determining, at the computing device, that the threshold area of the capacitive sensor array provided less than a threshold degree of response to the external stimulus and that no other area of the capacitive sensor array provided more than the threshold degree of response to the external stimulus. In some of those implementations, the input data is processed in response to determining that the threshold area of the capacitive sensor array provided less than the threshold degree of response to the external stimulus and that no other area of the capacitive sensor array provided more than the threshold degree of response to the external stimulus.

In some implementations, a method implemented by processor(s) is provided and includes causing, by a computing device, a display interface of the computing device to operate an array of capacitive touch sensors in furtherance of detecting input events occurring at the display interface. The input events can include a direct touch input event and a non-touch input event. The method further includes generating, based on the input events occurring at the display interface, a first training instance that indicates the input event of the input events was received at the display interface and included a non-touch input event. The non-touch input event corresponds to a user causing the display interface to be within a threshold distance from a facial feature of the user. The method further includes generating, based on the input events occurring at the display interface, a second training instance that indicates a separate input event of the input events was received at the display interface and included the direct touch input event. The direct touch input event corresponds to the user or another user causing the display interface to receive the direct touch input event at a surface of the display interface. The method further includes causing, based on the first instance of training data and the second instance of training data, one or more machine learning models to be trained in furtherance of facilitating responsiveness of an automated assistant application to a particular user causing the display interface to be within the threshold distance from the facial feature of the particular user. The automated assistant application utilizes the one or more trained machine learning models for initializing an automatic speech recognition process for being responsive to the particular user without initially detecting an express invocation input from the particular user.

These and other implementations of the technology disclosed herein can include one or more of the following features.

In some implementations, generating the second training instance includes generating area data that indicates a size of an area of the display interface that provided more than a threshold degree of response to the direct touch input event. In some of those implementations, generating the first training instance includes generating other area data that indicates a different size of another area of the display interface that provided less than the threshold degree of response to the non-touch input event.

In some implementations, generating the first training instance includes generating response data that indicates a subset of capacitive touch sensors of the array of capacitive touch sensors provided at least a threshold degree of response to the non-touch input event.

In some implementations, generating the first training instance includes generating other response data that indicates the array of capacitive touch sensors did not provide more than another threshold degree of response to the non-touch input event.

I claim:

1. A method implemented by one or more processors, the method comprising:
   generating, at a computing device, input data that characterizes a response of an array of capacitive touch sensors to an object that is: external to the computing device, and within a detectable distance from one or more capacitive touch sensors of the array of capacitive touch sensors,
      wherein the array of capacitive touch sensors facilitates tactile input and non-tactile input to a display interface of the computing device;
   identifying, based on the input data that characterizes the response of the array of capacitive touch sensors, that the input data corresponds to a facial feature of a user of the computing device;
   determining, based on the identifying that the input data corresponds to the facial feature of the user, that the display interface is within the detectable distance from the facial feature of a user,
      wherein the facial feature of the user is detected in furtherance of preparing for an interaction between the user and an automated assistant application that is accessible via the computing device; and
   in response to determining that the display interface is within the detectable distance from the facial feature of the user:
      causing, by the computing device, the automated assistant application to be responsive to a spoken utterance from the user without requiring an express invocation input from the user.

2. The method of claim 1, wherein causing the automated assistant application to be responsive to the spoken utterance from the user without requiring the express invocation input from the user includes:
   causing the automated assistant application to bypass requiring hotword detection for a duration of time after identifying that the input data corresponds to the facial feature of the user.

3. The method of claim 1, wherein determining that the display interface is within the detectable distance from the facial feature of the user includes:
   determining a magnitude of the response of the array of capacitive touch sensors relative to a threshold magnitude for the tactile input to the capacitive array of touch sensors,
      wherein the response corresponds to the facial feature of the user when the magnitude of the response does not satisfy the threshold magnitude for tactile inputs.

4. The method of claim 1, wherein determining that the display interface is within the detectable distance from the facial feature of the user includes:
   determining whether an area of the response of the array of capacitive touch sensors satisfies a threshold area for non-tactile inputs to the capacitive array of touch sensors,
      wherein the response corresponds to the facial feature of the user when the area of the response satisfies the threshold area for non-tactile inputs.

5. The method of claim 1, wherein identifying, based on the input data that characterizes the response of the array of capacitive touch sensors, that the input data corresponds to a facial feature of a user of the computing device includes:
   processing the input data using one or more trained machine learning models that have been trained from supervised training instances that each include a corresponding supervised label indicating whether a corresponding user maneuvered a corresponding display interface within the detectable distance of a head or other facial feature of the corresponding user.

6. The method of claim 1, wherein identifying, based on the input data that characterizes the response of the array of capacitive touch sensors, that the input data corresponds to a facial feature of a user of the computing device includes:
   processing the input data using one or more trained machine learning models that have been trained from training data that includes labels characterizing one or more others users holding respective display interfaces within the detectable distance from their faces.

7. The method of claim 1, further comprising:
in response to determining that the display interface is within the detectable distance from the facial feature of the user:
causing the computing device to render an output that indicates the automated assistant application has been invoked based on the response of the array of capacitive touch sensors.

8. One or more non-transitory computer-readable media (NTCRM) comprising instructions that, upon execution of the instructions by one or more processors of a computing device, are to cause the computing device to:
generate input data that characterizes a response of an array of capacitive touch sensors to an object that is:
external to the computing device, and within a detectable distance from one or more capacitive touch sensors of the array of capacitive touch sensors,
wherein the array of capacitive touch sensors facilitates tactile input and non-tactile input to a display interface of the computing device;
identify, based on the input data that characterizes the response of the array of capacitive touch sensors, that the input data corresponds to a facial feature of a user of the computing device;
determine, based on the identifying that the input data corresponds to the facial feature of the user, that the display interface is within the detectable distance from the facial feature of the user,
wherein the facial feature of the user is detected in furtherance of preparing for an interaction between the user and an automated assistant application that is accessible via the computing device; and
in response to a determination that the display interface is within the detectable distance from the facial feature of the user:
cause, by the computing device, the automated assistant application to be responsive to a spoken utterance from the user without requiring an express invocation input from the user.

9. The one or more NTCRM of claim 8, wherein the instructions to cause the automated assistant application to be responsive to the spoken utterance from the user without requiring the express invocation input from the user include instructions to:
cause the automated assistant application to bypass requiring hotword detection for a duration of time after identification that the input data corresponds to the facial feature of the user.

10. The one or more NTCRM of claim 8, wherein the instructions to determine that the display interface is within the detectable distance from the facial feature of the user include instructions to:
determine a magnitude of the response of the array of capacitive touch sensors relative to a threshold magnitude for the tactile input to the capacitive array of touch sensors,
wherein the response corresponds to the facial feature of the user when the magnitude of the response does not satisfy the threshold magnitude for tactile inputs.

11. The one or more NTCRM of claim 8, wherein the instructions to determine that the display interface is within the detectable distance from the facial feature of the user include instructions to:
determine whether an area of the response of the array of capacitive touch sensors satisfies a threshold area for non-tactile inputs to the capacitive array of touch sensors,
wherein the response corresponds to the facial feature of the user when the area of the response satisfies the threshold area for non-tactile inputs.

12. The one or more NTCRM of claim 8, wherein the instructions to identify, based on the input data that characterizes the response of the array of capacitive touch sensors, that the input data corresponds to a facial feature of a user of the computing device include instructions to:
process the input data using one or more trained machine learning models that have been trained from supervised training instances that each include a corresponding supervised label indicating whether a corresponding user maneuvered a corresponding display interface within the detectable distance of a head or other facial feature of the corresponding user.

13. The one or more NTCRM of claim 8, wherein the instructions to identify, based on the input data that characterizes the response of the array of capacitive touch sensors, that the input data corresponds to a facial feature of a user of the computing device include instructions to:
process the input data using one or more trained machine learning models that have been trained from training data that includes labels characterizing one or more other users holding respective display interfaces within the detectable distance from their faces.

14. The one or more NTCRM of claim 8, wherein the instructions are further to cause the one or more processors to:
in response to determining that the display interface is within the detectable distance from the facial feature of the user:
cause the computing device to render an output that indicates the automated assistant application has been invoked based on the response of the array of capacitive touch sensors.

15. A system comprising:
one or more processors; and
one or more non-transitory computer-readable media (NTCRM) comprising instructions that, upon execution of the instructions by the one or more processors, are to cause a computing device to:
generate input data that characterizes a response of an array of capacitive touch sensors to an object that is:
external to the computing device, and within a detectable distance from one or more capacitive touch sensors of the array of capacitive touch sensors,
wherein the array of capacitive touch sensors facilitates tactile input and non-tactile input to a display interface of the computing device;
identify, based on the input data that characterizes the response of the array of capacitive touch sensors, that the input data corresponds to a facial feature of a user of the computing device;
determine, based on the identifying that the input data corresponds to the facial feature of the user, that the display interface is within the detectable distance from the facial feature of the user,
wherein the facial feature of the user is detected in furtherance of preparing for an interaction between the user and an automated assistant application that is accessible via the computing device; and
in response to a determination that the display interface is within the detectable distance from the facial feature of the user:

cause, by the computing device, the automated assistant application to be responsive to a spoken utterance from the user without requiring an express invocation input from the user.

16. The system of claim 15, wherein the instructions to cause the automated assistant application to be responsive to the spoken utterance from the user without requiring the express invocation input from the user include instructions to:

cause the automated assistant application to bypass requiring hotword detection for a duration of time after identification that the input data corresponds to the facial feature of the user.

17. The system of claim 15, wherein the instructions to determine that the display interface is within the detectable distance from the facial feature of the user include instructions to:

determine a magnitude of the response of the array of capacitive touch sensors relative to a threshold magnitude for the tactile input to the capacitive array of touch sensors, wherein the response corresponds to the facial feature of the user when the magnitude of the response does not satisfy the threshold magnitude for tactile inputs.

18. The system of claim 15, wherein the instructions to determine that the display interface is within the detectable distance from the facial feature of the user include instructions to:

determine whether an area of the response of the array of capacitive touch sensors satisfies a threshold area for non-tactile inputs to the capacitive array of touch sensors, wherein the response corresponds to the facial feature of the user when the area of the response satisfies the threshold area for non-tactile inputs.

19. The system of claim 15, wherein the instructions to identify, based on the input data that characterizes the response of the array of capacitive touch sensors, that the input data corresponds to a facial feature of a user of the computing device include instructions to:

process the input data using one or more trained machine learning models that have been trained from supervised training instances that each include a corresponding supervised label indicating whether a corresponding user maneuvered a corresponding display interface within the detectable distance of a head or other facial feature of the corresponding user.

20. The system of claim 15, wherein the instructions to identify, based on the input data that characterizes the response of the array of capacitive touch sensors, that the input data corresponds to a facial feature of a user of the computing device include instructions to:

process the input data using one or more trained machine learning models that have been trained from training data that includes labels characterizing one or more other users holding respective display interfaces within the detectable distance from their faces.

* * * * *